United States Patent [19]

Seynhaeve: André G.

[11] Patent Number: 4,953,257
[45] Date of Patent: Sep. 4, 1990

[54] CASTER WHEEL

[75] Inventor: Seynhaeve: André G., Senlis, France

[73] Assignee: Delsey S.A., Bobigny Cedex, France

[21] Appl. No.: 326,061

[22] Filed: Mar. 21, 1989

[30] Foreign Application Priority Data

Apr. 5, 1988 [FR] France ................... 88 04424

[51] Int. Cl.⁵ .................... B60B 5/00; B60B 30/00
[52] U.S. Cl. ............................................ 16/45; 16/38
[58] Field of Search ..................... 16/29, 47, 45, 38

[56] References Cited

U.S. PATENT DOCUMENTS 4,067,083  1/1978  Greene .
4,463,840  8/1984  Seynhaeve ................ 16/29

FOREIGN PATENT DOCUMENTS 287825   10/1988  European Pat. Off. ............... 16/47
2620076   9/1977  Fed. Rep. of Germany .
8509303  10/1985  Fed. Rep. of Germany .
1374193   8/1964  France .
2177283  11/1973  France .
2233188   1/1975  France .
2521840   8/1983  France .
1080302   8/1967  United Kingdom .

Primary Examiner—Richard K. Seidel
Assistant Examiner—Carmine Cuda
Attorney, Agent, or Firm—Young & Thompson

[57] ABSTRACT

The wheel according to the invention is characterized by the fact that it includes a molded rim inside the bore of which is resiliently engaged a brace molded from a resiliently deformable material and a metallic axis forcibly crimped inside a bore of said brace.

8 Claims, 2 Drawing Sheets

CASTER WHEEL

FIELD OF THE INVENTION

The invention relates to a wheel, notably for baggage such as suit-cases or traveling bags.

The use of wheels for facilitating the displacement of baggage has known a large development. The wheels used, due to the competitivity of the baggage market, have to be of a low cost, very easy to mount while being resistant, impossible to dismantle, not noisy, little sensitive to wear or to jamming.

OBJECTS AND SUMMARY OF THE INVENTION

The present invention aims at providing a new wheel, notably for baggage, having simultaneously all these qualities, which is not the case of the presently available baggage wheels.

To this effect, the wheel according to the invention is characterized by the fact that it includes a moulded rim, inside the bore of which is resiliently engaged a brace moulded from a resiliently deformable material and a metallic axis forcibly crimped in a bore of said brace.

Preferably, a flexible outer cover made of the same thermoplastic family as that of the rim is moulded on the rim.

BRIEF DESCRIPTION OF DRAWINGS

The invention will be better understood from the reading of the following description, with reference to the accompanying drawing wherein.

DETAILED DESCRIPTION OF THE INVENTION

Figure 1:
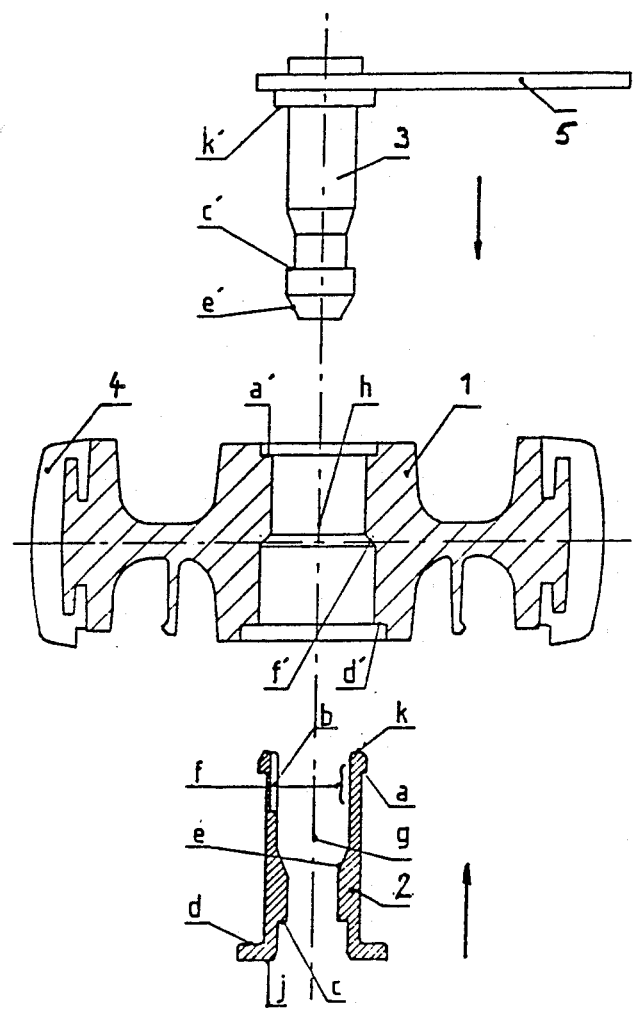
FIG. 1 is an axial sectional partly in plan schematic view of the elements of a wheel according to an embodiment of the invention, prior to assembly.

The wheel according to the invention is made of a rim 1, a brace 2 resiliently engaged inside the rim 1 and a metallic axis 3 forcibly crimped inside rim 1.

Rim 1 is molded from a material having good cold mechanical properties, for example a poly-olefine copolymer. On rim 1 is moulded a flexible outer cover 4 made of a material of the same thermoplastic family as that of the rim so that, being perfectly compatible with this copolymer, a perfect adherence between the two materials is ensured, without any risk of separation between rim 1 and its cover 4. The flexibility of outer cover 2 cancels the rolling noises.

In order to avoid a bad flow and heat behaviour, brace 2 is snapped inside a central bore h of rim 1, which is in turn moulded from a material exhibiting a good mechanical behaviour, a good resistance to wear and a good resistance to friction heating, as well as an aptitude to accommodate large deformations when being forced on rim 1 and when receiving axis 3.

This axis 3 can be of anticorrosion treated metal and is mounted on a platen 5 treated in the same way and formed with fixation holes for a baggage.

Figure 2:
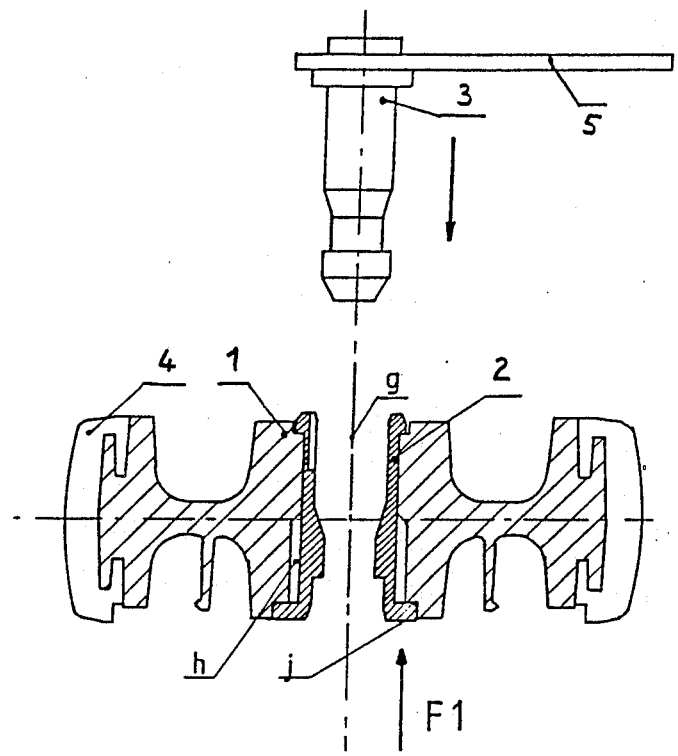
FIG. 2 is similar to FIG. 1, the unit being shown during mounting.

FIG. 2 shows the assembly of brace 2 which can be snapped inside bore h of rim 1.

By application of a force F1 of the face j of brace 2, in the axis of bore h of rim 1, the end material f of the brace is deformed by compression toward the inside of the cone-shaped passage f' of bore h. After complete introduction of brace 2 up to shoulder d, the end f resumes its initial shape since the resiliency of the material allows it.

Shoulder a of brace 2 comes to bear over recess a' of rim 1 and shoulder d of said brace on recess d' of rim 1, thereby creating an impossibility of disassembling it.

Moreover, blind recesses b, regularly distributed angularly inside the bore of end 2, increase the flexibility and resiliency when mounting it inside bore h of rim 1.

Figure 3:
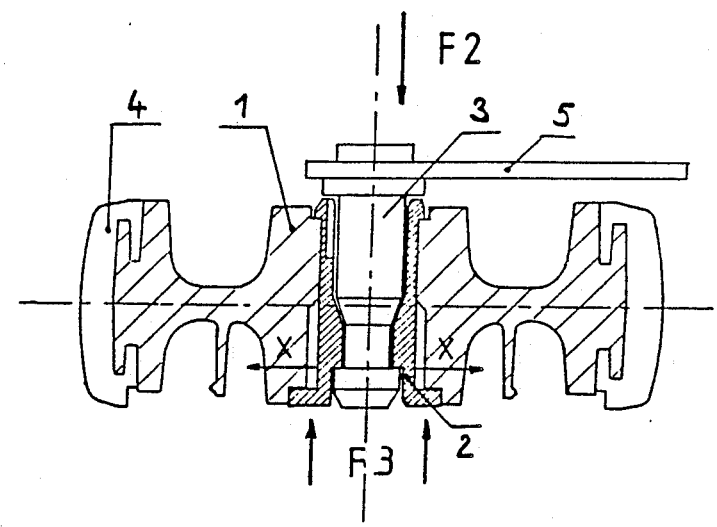
FIG. 3 is similar to FIGS. 1 and 2, the wheel being mounted.

FIG. 3 shows the assembly of metallic axis 3 in brace 2.

By application of a force F2 on metallic axis 2, compensated by an equal and opposite support force F3 applied on face j of brace 2, the metallic axis 1 is introduced in bore g of brace 2.

Cone e' of metallic axis 3 comes to bear forcibly on cone e of brace 2. Force F2 is such that the portion situated behind the cone is deformed in the direction of arrow X, in the recess h provided to this effect between the inside diameter of the bore of rim 1 and the outer diameter of brace 2.

When shoulder k' of axis 3 comes in mechanical abutment on the end k of brace 2, shoulder c' of metallic axis 3 comes to bear on recess c of brace 2 which has resumed its position of origin after resilient deformation, thereby creating an impossibility of a disassembly.

Moreover, metallic axis 3, due to its position, latches brace 2 in zone f and mainly the inner diameter.

I claim:

1. A wheel, notably for baggage such as a suit-case or a traveling bag, characterized by the fact that it includes a moulded rim inside the bore of which is resiliently engaged a brace moulded from a resiliently deformable material and a metallic axis forcibly crimped inside a bore of said brace, wherein said bore of the rim includes a cone with which cooperates a deformable end of said brace.

2. A wheel according to claim 1, characterized by the fact that said rim is made of a poly-olefine copolymer.

3. A wheel according to claim 1, characterized by the fact that over said rim is moulded a flexible outer cover in a material of the same thermoplastic family as that of said rim.

4. A wheel according to claim 1, characterized by the fact that said brace includes at both ends outer shoulders cooperating with recesses of said bore of the rim.

5. A wheel according to claim 1, characterized by the fact that said deformable end of said brace includes a plurality of blind recesses regularly and angularly distributed inside the axial bore of said brace.

6. A wheel according to claim 1, characterized by the fact that the axial bore of said brace includes a cone with which cooperates a frustoconical end of said axis, opposite an enlargement of the bore of said rim.

7. A wheel according to claim 1, characterized by the fact that the bore of said brace is formed with a recess with which cooperates a shoulder of said axis.

8. A wheel according to claim 1, characterized by the fact that said axis is crimped on a platen formed with fixation holes, the assembly having been subjected to an anticorrosion treatment.

* * * * *